March 29, 1938. E. A. THIBODEAUX 2,112,796

TRAP

Filed Aug. 4, 1937 2 Sheets-Sheet 1

Inventor
E. A. Thibodeaux
By H. B. Willson & Co.
Attorneys

March 29, 1938.  E. A. THIBODEAUX  2,112,796

TRAP

Filed Aug. 4, 1937  2 Sheets—Sheet 2

Inventor
E. A. Thibodeaux
By H. B. Willson & Co.
Attorneys

Patented Mar. 29, 1938

2,112,796

UNITED STATES PATENT OFFICE 2,112,796

TRAP

Ernest A. Thibodeaux, Houma, La.

Application August 4, 1937, Serial No. 157,388

2 Claims. (Cl. 43—92)

The invention relates to a new and improved trap intended primarily for catching muskrats and minks, and the object of the invention is to provide a simple and inexpensive, relatively light, safe and humane trap which will be highly efficient and durable, will almost instantly kill, and will not injure the pelt.

With the foregoing in view, the invention resides in the novel subject matter hereinafter described and claimed, description being accomplished by reference to the accompanying drawings.

Figure 1:
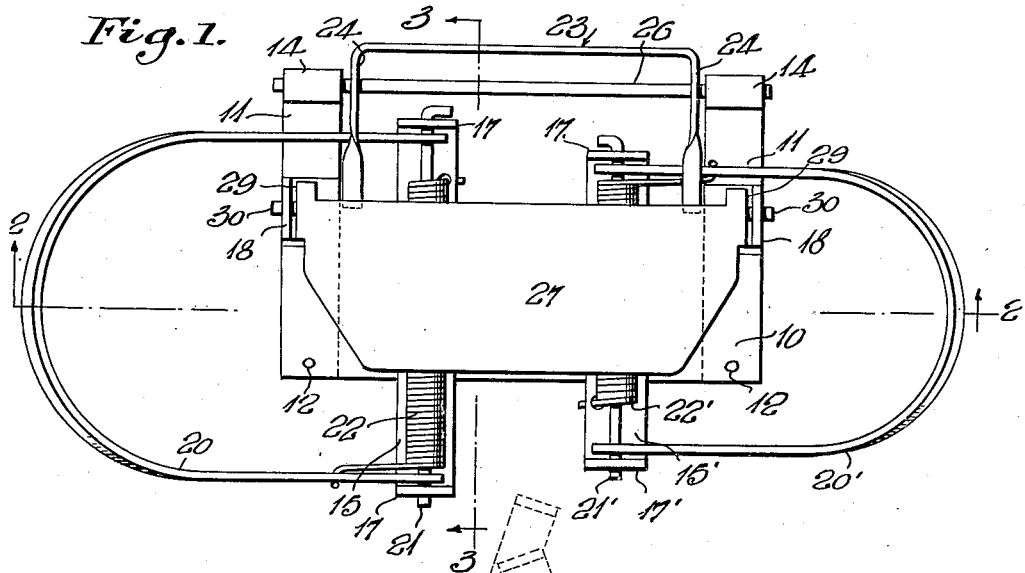
Fig. 1 is a top plan view showing the trap in set position.
Figure 2:
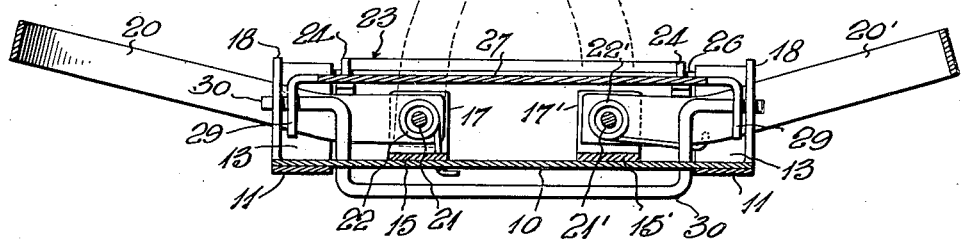
Fig. 2 is a longitudinal sectional view on line 2—2 of Fig. 1.
Figure 3:
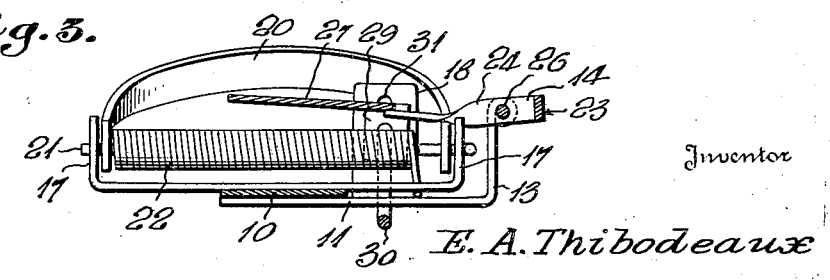
Fig. 3 is a transverse sectional view on line 3—3 of Fig. 1.
Figure 4:
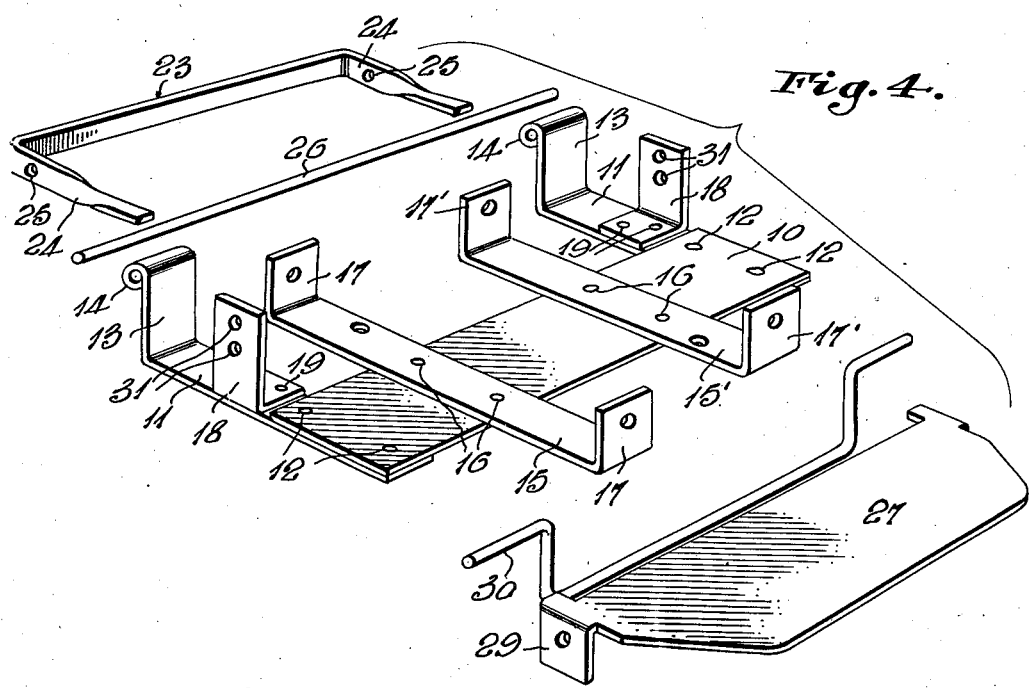
Figs. 4 and 5 are perspective views showing a number of the trap parts disassembled.
Figure 5:
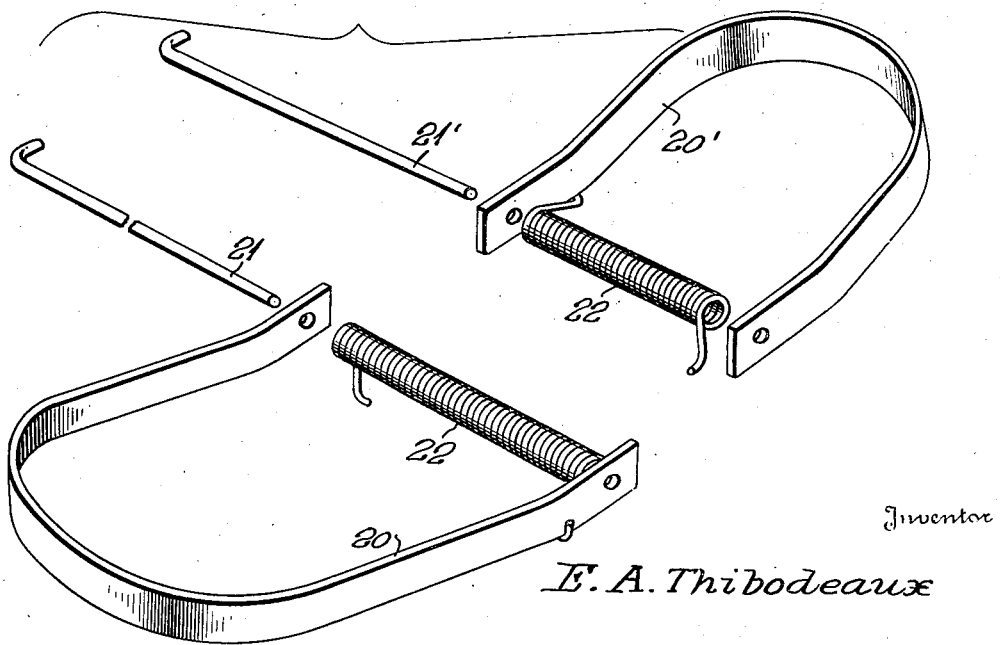

A preferred construction has been illustrated in the drawings and will be rather specifically described, with the understanding however, that within the scope of the invention as claimed, variations may be made.

I provide a horizontally elongated base plate 10 preferably of rectangular form, to the ends of which two transverse strips 11 are secured by rivets or the like 12, said strips projecting laterally beyond one longitudinal edge of said base plate and having their outer ends bent upwardly to provide an outer pair of posts 13, the upper ends of said posts being bent to provide knuckles 14, in the present disclosure. Two additional transverse strips 15 and 15' are secured by rivets or the like 16 to the base plate 10, said strips being in spaced parallel relation with each other and in similar relation with the strips 11. The ends of both strips 15 and 15' project laterally beyond both longitudinal edges of the base plate 10 and are bent upwardly to provide the strip 15 with lugs 17 and the strip 15' with lugs 17'. To the laterally projecting portions of the strips 11, inner posts 18 are secured by rivets or the like 19.

Two upwardly and inwardly swingable, spring-actuated, U-shaped jaws 20 and 20' are provided, the jaw 20 being pivoted at the free ends of its side arms to the lugs 17 by means of a suitable pivot rod or the like 21. The jaw 20' is similarly pivoted by a rod or the like 21' to the lugs 17'. When the jaws are in set position, the side arms thereof toward the posts 13 and 18 are disposed between these posts, the actuating springs 22 and 22' of the jaws being then so tensioned as to be capable of forcibly swinging said jaws upwardly and inwardly to operative position, when such jaw movement is permitted.

A U-shaped jaw-holding member 23 extends between and is pivoted to the upper ends of the outer posts 13, and in the present disclosure, the side arms 24 of said U-shaped member 23 are provided with openings 25 through which a pivot rod 26 passes, the ends of said rod being held in the knuckles 14. The arms 24 are swingable downwardly over the adjacent arms of the jaws 20 and 20' to hold said jaws in set position, and the entire member 23 is held in operative position, by means of a trigger plate 27. This trigger plate extends between and is pivoted to the inner posts 18, said plate being engageable with the free ends of the arms 24 to releasably hold the latter in operative position. In the construction herein disclosed, the trigger plate 27 is provided with downwardly projecting lugs 29 disposed at the inner sides of the posts 18, and the ends of a centrally depressed pivot rod 30 are passed through openings in said lugs and posts, the depressed portion of said pivot rod extending under the strips 15 and 15'. If desired, each post 18 may be provided with two vertically spaced openings 31 with either one of which the rod 30 may be engaged, to dispose the trigger plate 27 at a relatively high position or a comparatively low position. When the rod 30 is in the uppermost of the openings 31, the set jaws will not be as low as when said rod is engaged with the lowermost of said openings, and consequently, the springs 22 and 22' will not be under such severe tension, and it is obviously advantageous to be able to adjust the trap in this manner according to the kind of animals to be caught.

To set the trap, the jaws 20 and 20' are swung downwardly and outwardly and the jaw-holding member 23 is so swung that its side arms 24 overlie the adjacent side arms of said jaws, the trigger plate 27 being then swung to the position in which it overlies the free ends of said arms 24, the jaws being then released while holding the trigger plate in its operative position. When the trigger plate is depressed and released by an animal, it releases the jaw-holding member 23 which then swings to a position outside of the zone in which the jaws are operable, allowing upward and inward swinging of these jaws under the tension of the springs 22 and 22' to catch and almost instantly kill the animal, without injury to the pelt and with minimum pain to the catch. It is not necessary to position the trap in any particular manner when setting it as it will operate regardless of the direction from which the animal approaches. Moreover, it is not necessary that the trap be chained or otherwise fastened, for the prey is killed before he can drag the trap any appreciable distance. The device is simple, inexpensive, light, easy to set, efficient and durable and is preferably constructed in the manner herein disclosed, attention being again invited, however, to the possibility of making variations within the scope of the invention as claimed.

I claim:

1. A trap comprising a base, two upwardly and inwardly swingable spring-actuated U-shaped jaws pivoted upon said base on parallel axes, a U-shaped jaw-holding member pivoted upon said base on an axis transverse to the pivotal axes of said U-shaped jaws, the pivotal axis of said U-shaped jaw-holding member being transverse to the side arms of this member and being disposed outside of the zone in which said U-shaped jaws are movable, said side arms of said U-shaped jaw-holding member being downwardly swingable over the adjacent side arms of said U-shaped jaws to hold the latter in set position, and a trigger plate pivoted upon said base on an axis parallel with said pivotal axis of said U-shaped jaw-holding member, said trigger plate and its pivotal axis being disposed within the confines of said U-shaped jaws when the latter are in set position, said trigger plate being engageable with the free ends of said side arms of said U-shaped jaw-holding member to releasably hold the latter in set position, said jaw-holding member when released being swingable to a position outside of said zone in which said jaws are movable.

2. A trap comprising an elongated base plate, two transverse strips secured to the ends of said base plate respectively and projecting laterally beyond one longitudinal edge of said base plate, the outer ends of said strips being bent upwardly to provide an outer pair of posts, an inner pair of posts secured to and projecting upwardly from the laterally projecting portions of said strips, two additional transverse strips secured to said base plate in spaced parallel relation with each other and with the first mentioned strips, said additional strips projecting laterally beyond both longitudinal edges of said base plate and having their ends bent upwardly to form lugs, two upwardly and inwardly swingable spring-actuated U-shaped jaws, the side arms of one of said U-shaped jaws being pivoted to the lugs of one of said additional strips, and the side arms of the other of said U-shaped jaws being pivoted to the lugs of the other of said additional strips, a jaw-holding member extending between and pivoted to the posts of the aforesaid outer pair, said jaw-holding member being downwardly swingable over the adjacent side arms of said U-shaped jaws to hold the latter in set position, and a trigger plate extending between and pivoted to the posts of said inner pair, said trigger plate and the posts to which it is pivoted being within the confines of said U-shaped jaws when the latter are in set position, said trigger plate being engageable with said jaw-holding member to releasably hold the latter in operative position, said jaw-holding member when in released position and the posts to which it is pivoted being outside the zone in which said jaws are movable.

ERNEST A. THIBODEAUX.